Figure 1:
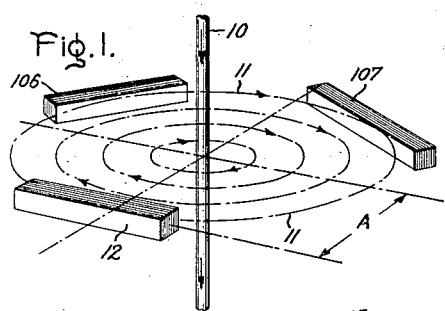

Jan. 2, 1934. C. M. FOUST ET AL 1,942,052

METHOD OF AND INSTRUMENT FOR MEASURING SURGE CURRENTS

Filed Nov. 26, 1932 2 Sheets-Sheet 1

Inventors:
Clifford M. Foust,
Hans P. Kuehni,
by Charles E. Muller
Their Attorney.

Jan. 2, 1934.  C. M. FOUST ET AL  1,942,052
METHOD OF AND INSTRUMENT FOR MEASURING SURGE CURRENTS
Filed Nov. 26, 1932  2 Sheets-Sheet 2
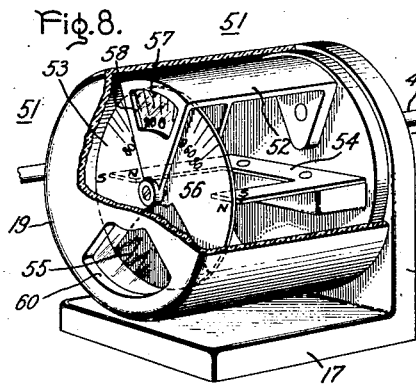
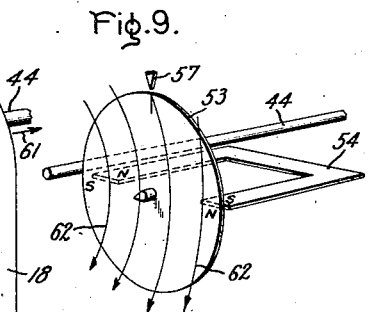
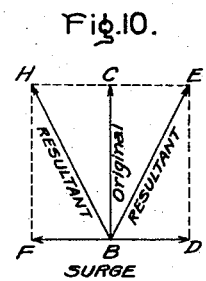
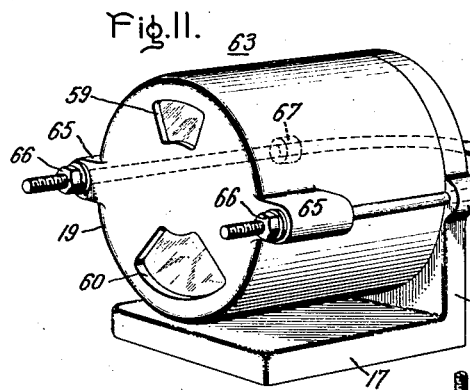
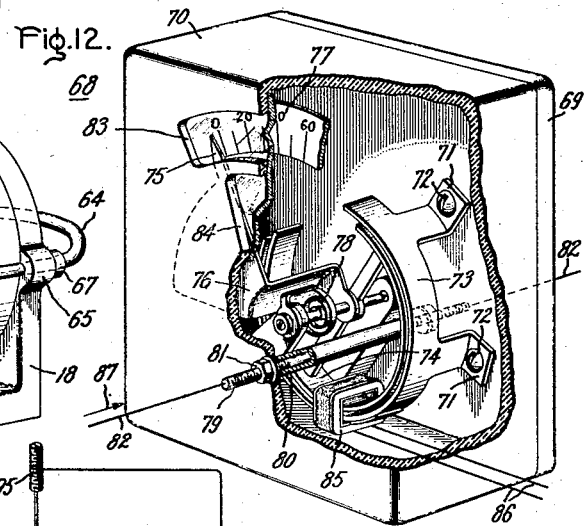
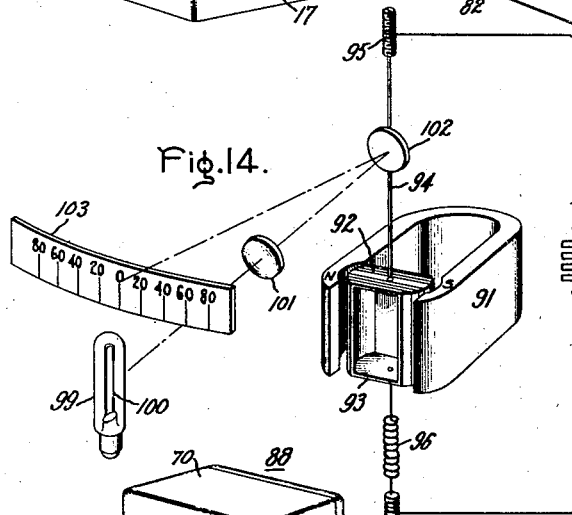
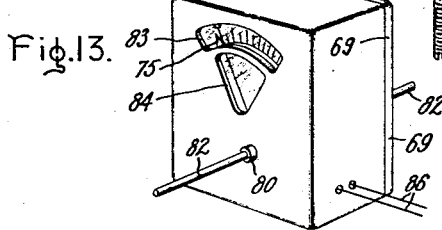
Inventors:
Clifford M. Foust,
Hans P. Kuehni,
by *Charles N. Tulla*
Their Attorney.

Patented Jan. 2, 1934

1,942,052

UNITED STATES PATENT OFFICE 1,942,052

METHOD OF AND INSTRUMENT FOR MEASURING SURGE CURRENTS

Clifford M. Foust and Hans P. Kuehni, Schenectady, N. Y., assignors to General Electric Company, a corporation of New York Application November 26, 1932
Serial No. 644,504

26 Claims. (Cl. 175—183)

Our invention relates to surge current instruments. The principal object of our invention is to provide a method of, and an instrument for, measuring the maximum value of an electric current surge that flowed through a conducting body, the indication to remain visible after the occurrence of the surge. An additional object of our invention is to provide an instrument which may be placed adjacent a conducting body that is remote from a convenient observation point, and which will give an indication that is clearly visible from the observation point as to whether or not a surge current has flowed through the conducting body. A still further object of our invention is to provide a method of, and apparatus for, determining the time elements and wave shape of an electric current surge passing through a conducting body.

There is a long-felt need in the electrical industry for a simple and inexpensive indicating instrument that will accurately measure and indicate the maximum value of an electric current surge that flowed through a conducting body even though the surge lasts only a few micro-seconds, the indication to remain visible after the occurrence of the surge. For example, there is an important need for an instrument that will accurately measure and indicate the maximum value of the current surge that flows through a transmission tower leg or arm supporting the line insulators when the latter are flashed over by reason of a lightning stroke terminating on one or more of the line conductors, or by reason of a switching operation, and that will accurately measure and indicate the maximum value of the surge current that flows through a lightning arrester due to either of the above mentioned reasons. This information is of vital importance in lightning research and transmission system stability investigations, because it is a useful guide in determining what steps should be taken to decrease the number of trip-outs on a transmission system.

Furthermore, since transmission line insulators, high voltage transformers, lightning arresters, etc., are subjected to very high voltage strains by reason of lightning strokes terminating on one or more of the line conductors of the transmission system, or by reason of switching operations, it is rapidly becoming the standard practice for manufacturers of such apparatus to test their impulse strength in the factory by subjecting each piece of apparatus to as high a voltage and for as long a period as it is likely to be subjected to after installation on the transmission system. These impulse tests are made in the factory in order to prevent the shipment of apparatus which is likely to break down in service. A large surge current flows for a very short period through a piece of apparatus when it is tested for its impulse strength, and it is highly desirable to know the maximum value of this surge current.

Various attempts have been made to measure the maximum value of these surge currents, but so far as we know none of them gave reliable results. For example, the latest practice was to utilize the voltage drop caused by the surge current flowing in the tower arm or leg, or in the lightning arrester ground lead, or in the conductor connected to a piece of apparatus being tested for its impulse strength, or in a resistance connected in series with any of these structures, and to measure the voltage drop across a portion of the structure or across the series connected resistance by means of a Lichtenberg figure camera recorder, such as shown for example in U. S. Patent 1,649,180, Peters. The limited voltage sensitivity of this recorder made it necessary to bridge a considerable length of the tower arm or leg, or lead, or conductor, as the case may be, in order to obtain a sufficiently high voltage drop to operate the recorder. The effective resistance of the bridged portion, or of the series connected resistance, was very uncertain because of skin effect phenomena and in addition the inductive voltage drop could not properly be taken into account. In view of these uncertain factors the measurement obtained of the surge current was very unreliable. It therefore became desirable to provide some method, or some instrument, or both, that will accurately measure and indicate the maximum value of an electric current surge irrespective of its duration. Our invention provides such a method and such an instrument.

Briefly described, our method consists of placing a substantially unmagnetized magnetic body possessing a high degree of magnetic retentivity adjacent the conducting member through which the surge current flows so that the magnetic flux in the space surrounding the latter due to the current flow therethrough effects the magnetization of this magnetic body, and (1) testing the magnetic body after the occurrence of the current surge by causing the magnetic flux retained by it to thread a coil so as to induce a voltage in the coil, and impressing this induced voltage on a suitably calibrated indicating instrument; or (2) measuring the strength of the magnetic flux retained by the magnetic body after the surge by placing it in an indicating instrument which is responsive to this flux and which gives a deflection that is proportional to the strength of this flux. Our surge current ammeter, briefly described, consists of a stationary member, a movable member in a normally stationary position, one of these members consisting of a magnetic body possessing a high degree of magnetic retentivity and so positioned relatively to the conducting body through which the surge current flows that the magnetic flux in the space surrounding the latter due to the current flow therethrough effects the magnetization of this magnetic body, and the other of these members consisting of a magnetic element so positioned relatively to said conducting body and to said magnetic body that the magnetization of the latter effects a movement of the movable member from its normally stationary position to a different stationary position. The instrument also has means operatively associated with its movable member for indicating in terms of amperes the amount it moves from its normally stationary position.

In electrical installations it often occurs that an electric current surge flows through a conducting body that is remote from a convenient observation point. In many such cases it is desired to have an instrument which may be placed adjacent to the conducting body, and which will give an indication that is clearly visible from the observation point that a surge current has flowed through the conducting body, the indication to remain visible after the occurrence of the surge. We provide this type of instrument by attaching an indicating element to the movable member of our previously described instrument and providing means for making this indicating element invisible from the observation point when the movable member is in its normally stationary position and clearly visible from the observation point when the movable member has moved away from its normally stationary position.

Our invention, however, will be best understood from the following description when considered in connection with the accompanying drawings, while those features of our invention which are believed to be novel and patentable are pointed out in the appended claims.

Figure 2:
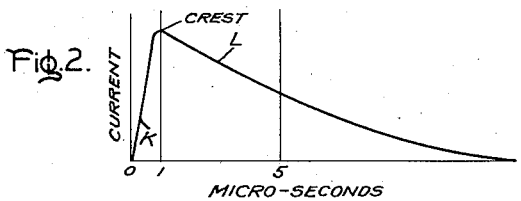
Figure 3:
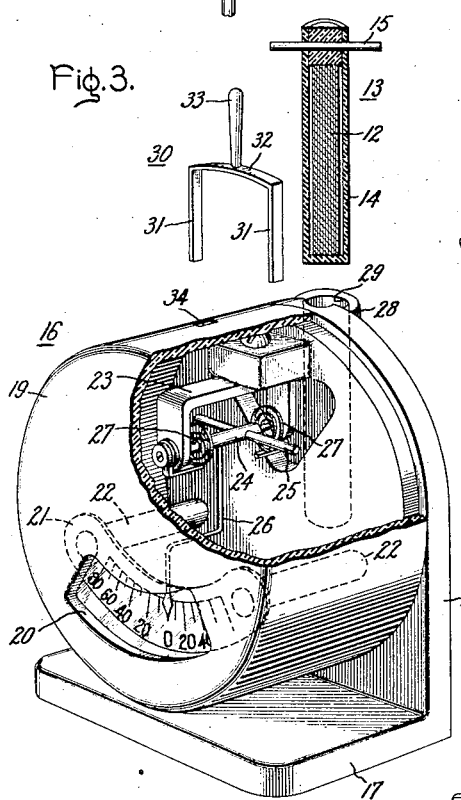
Figure 5:
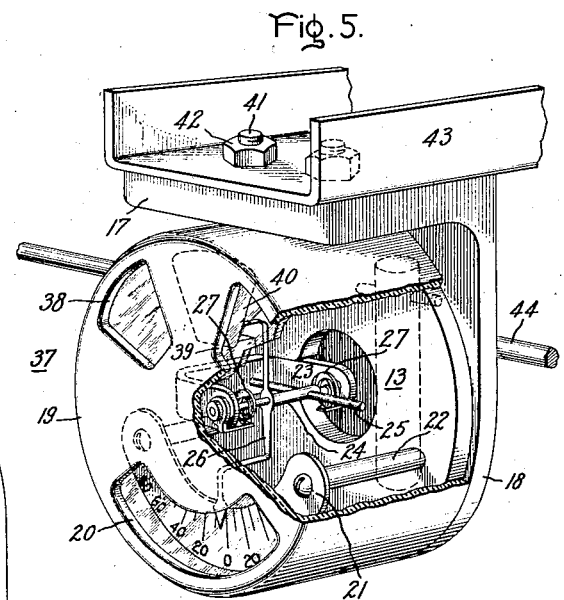
Figure 4:
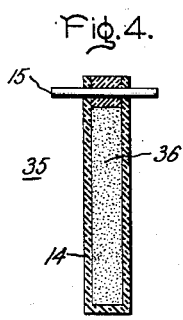
Figure 6:
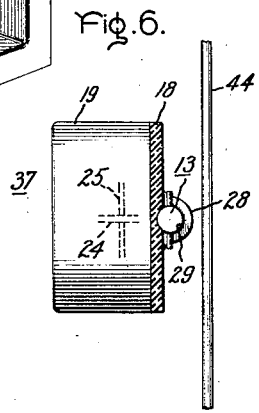
Figure 7:
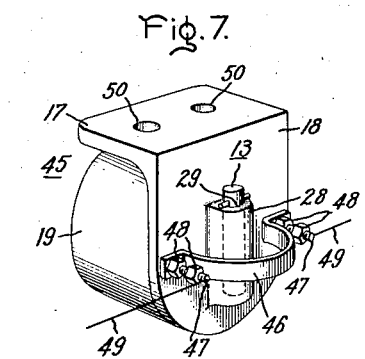

Fig. 1 represents several of our magnetic pick-up elements adjacent to a conductor through which a surge current is flowing, this figure being useful in explaining the underlying principle of our invention. Fig. 2 shows the relationship between time and magnitude of the surge current flowing through the conductor shown in Fig. 1. Fig. 3 represents a preferred embodiment of our surge current ammeter with one form of our magnetic pick-up element. Fig. 4 represents another form of our magnetic pick-up element. Fig. 5 represents a preferred embodiment of our surge current ammeter with one form of our magnetic pick-up element, all assembled adjacent to a conducting member for measuring the maximum value of a surge current flowing through the latter, and for giving an indication of this fact that is clearly visible from a distant observation point. Fig. 6 shows a top view of the instrument shown in Fig. 5 and its relationship to the conducting member. Fig. 7 shows the preferred embodiment of our surge current ammeter provided with a conducting strap permanently secured thereto, this strap to be connected in series with the conducting body through which the surge current flows. Fig. 8 represents another embodiment of our surge current ammeter positioned adjacent a conducting member for measuring the maximum value of a surge current flowing through the latter, and for giving an indication of this fact that is clearly visible from a distant observation point. Fig. 9 represents some of the internal parts of the instrument shown in Fig. 8. Fig. 10 represents a vector diagram useful for explaining the operation of the instrument shown in Fig. 8. Fig. 11 shows the instrument of Fig. 8 provided with a conductor rod permanently secured thereto, this rod to be connected in series with the conducting body through which the surge current flows. Fig. 12 represents a third embodiment of our surge current ammeter provided with a conducting rod permanently secured thereto, the rod to be connected in series with the conducting body through which the surge current flows. Fig. 13 shows the instrument of Fig. 12 arranged so that the conducting body passes directly therethrough. Fig. 14 represents one testing device that may be used to test any form of our magnetic pick-up element so as to determine the direction and maximum value of a surge current that flowed through a conductor. Similar parts in the various figures are represented by the same reference numerals.

In Fig. 1, let 10 represent a conducting body of some kind, e. g., a transmission line conductor or tower arm, or a lightning arrester ground lead, or any other conductor, through which a surge current flows in the direction shown by the arrows thereon. Assume for example that curve KL shown in Fig. 2 represents the relationship between time and magnitude of the surge current. It can be seen that the surge current rises from zero to its maximum value in 1 micro-second, decreases to one half its maximum value in 4 more micro-seconds, and then decreases to zero in several more micro-seconds. This type of a surge is for brevity called a 1-5 micro-second surge. No values of current are shown in the ordinate of the curve since the actual current values are immaterial to this discussion. Now assume that it is desired to measure the crest value, i. e., the maximum value of this surge current. It is obvious that at every instant during this surge there is a magnetic flux surrounding conductor 10 in Fig. 1, as shown for example by the dotted lines 11. At any given distance from conductor 10 the intensity of this magnetic flux at every instant is substantially directly proportional to the magnitude of the surge current at the instant being considered.

At a suitable distance from conductor 10 we place a substantially unmagnetized magnetic pick-up element so that it will become magnetized by the magnetic flux surrounding the conductor during the surge. This pick-up element may be made of any material possessing a high degree of magnetic retentivity so that it will retain an appreciable amount of magnetic flux after the surge is over. Thus, for example, at a distance represented by A from conductor 10 we place a plurality of thin strips of cobalt steel represented by 12. Ordinarily, these strips will be confined within a container of non-magnetic material (as shown in Fig. 3) which will be supported by some suitable means so that the strips will be positioned as shown in Fig. 1. However, in order to present the clearest possible view, we have omitted from Fig. 1 the container and its supporting means and have shown only the strips in their proper relation to conductor 10. We prefer to use cobalt steel, because this material possesses a high degree of magnetic retentivity, but it should be understood that our invention is not limited to this material since any other material possessing this quality may be employed. The total magnetic flux retained by strips 12 after the surge is over will depend on several factors, among which are the thickness of each strip, the number of strips, their distance from conductor 10, the maximum value of the surge current, and the time it takes the surge to reach its maximum value from zero. During the surge the strips 12 are threaded by a magnetic flux of varying intensity surrounding conductor 10, hence eddy currents are caused to flow in the strips which tend to oppose their magnetization by this flux. Therefore, all other factors being equal, the thinner the strips are the smaller will be the value of the eddy currents flowing therethrough and the greater will be the magnetic flux retained by them after the surge is over. Laboratory tests conducted by us with strips .005 inch thick have shown that they are very satisfactory to use with fast surges, e. g., a 1-5 micro-second surge. However, it is obvious that in some cases it will be satisfactory to use thicker strips, in fact with very slow surges it may be satisfactory to use one solid piece, whereas with faster surges it may be necessary or desirable to use thinner strips, or even use a mass of very small particles, as shown for example in Fig. 4. It is obvious that whatever form of magnetic pick-up element is employed, the magnetic flux retained by it after the surge is over will be a function of the maximum value of the surge current. We therefore wish it clearly understood that our invention is not limited to any specific form of magnetic pick-up element.

After the surge is over the maximum value of the surge current may be determined by either of the following two ways:

1. The magnetic pick-up element may be tested by causing the magnetic flux retained by it to thread a coil so as to induce a voltage in the coil, and impressing this induced voltage on an indicating instrument which is calibrated so that each indication thereof corresponds to a known maximum value of surge current passing through the conducting member, or 2. The magnetic pick-up element may be placed in one of our instruments which will then indicate the maximum value of the surge current.

Having outlined the basic principle of our invention, we will now proceed to explain the same in detail.

In Fig. 3, the complete magnetic pick-up element is represented by 13 and consists of the cobalt steel laminations 12 inside of a hollow container of non-magnetic material represented by 14. This container is closed at one end and open at the opposite end for the insertion and withdrawal of the strips. A pin 15 passes through the container near its open end so as to be above the strips, to prevent the latter from dropping out irrespective of the position of the element and to serve another useful purpose which will be explained later. The pin 15 has a sliding fit in the container so that it can be readily removed. The indicating instrument is represented generally by 16, and consists of a base 17 having integral therewith or secured thereto a vertical shelf 18, and a hollow cylindrically shaped cover 19 removably secured by any suitable means (not shown) to shelf 18, all being preferably made of non-magnetic material. Cover 19 has a window 20, behind which is a graduated scale 21 secured to posts 22 carried by shelf 18. Scale 21 is of the zero center type, i. e., it has its zero mark at approximately the center with similarly marked graduations on both sides of the zero mark. A portion of cover 19 is broken away in order to give a clear view of the internal parts of the instrument. Secured to the inside of shelf 18 is a C-shaped bracket 23 in which is rotatably or pivotally mounted a small shaft 24. A small bar 25 is secured to shaft 24 with its longitudinal axis at a right angle to the axis of rotation of shaft 24. Bar 25 is preferably a permanent magnet with poles of opposite polarities at its two ends, but we wish it strictly understood that this is desirable, but not essential, since our instrument will operate when bar 25 is not a permanent magnet, providing however it is made of magnetic material. Secured to shaft 24 is an indicating pointer 26 adapted to sweep over scale 21 so as to be visible through window 20. Two oppositely wound spiral springs 27 are respectively secured to the opposite ends of shaft 24 and bracket 23 so that one spring resists movement of the shaft in one direction and the other spring resists movement of the shaft in the other direction. Springs 27 are so adjusted and the various moving parts are so arranged that bar 25 is horizontal when it is in its normally stationary position, and pointer 26 then registers with the zero mark on scale 21. On the back side of shelf 18 is a boss 28 having a hole 29 whose axis is substantially perpendicular to the axis of bar 25 when the latter is in its normally stationary position. This hole is preferably so positioned with respect to shaft 24 that the axis of the shaft intersects the axis of the hole. The diameter and depth of hole 29 are such that pick-up element 13 can be readily inserted therein with the bottom of the element resting on the bottom of the hole and with the element extending approximately equal amounts above and below the axis of rotation of shaft 24. A stop-key represented by 30 consists of two parallel legs 31 secured to or integral with a back leg 32, to which is secured a handle 33. Legs 31 are adapted to slide through two holes in the top of cover 19, one of these holes being represented by 34, and the other hole not being shown since it is in the broken away portion of the cover. The spacing between legs 31 and their length are such that when they are inserted in and lowered through holes 34 of cover 19, their ends will rest on bar 25 near its opposite ends, thereby preventing rotation of the bar in either direction. This locks the internal moving parts of the instrument so that the latter may be transported without injury even though it is subjected to appreciable vibration. Preferably, legs 31 and 32 of the stop-key are made of magnetic material so as to act as a magnetic keeper or armature for bar 25 if the latter is a permanent magnet, thus tending to prevent demagnetization of the magnet when the instrument is not being used.

Now assume that it is desired to measure the maximum value of a surge current passing through conductor 10 in Fig. 1. Pick-up element 13 in Fig. 3 will be placed adjacent to conductor 10 so that its laminations 12 will be positioned as shown in Fig. 1, and so that its pin 15 is, for example, on the right-hand side of the axis of the conductor when the latter is viewed by looking at the front of the drawings. If the surge current flows through conductor 10 in the direction shown by the arrows thereon the pick-up element will become magnetized with an S pole at the end having pin 15 and an N pole at the opposite end, whereas if the surge current flows through conductor 10 in the opposite direction the pick-up element will become magnetized with an N pole at the end having pin 15 and an S pole at the opposite end. After the surge is over the pick-up element is brought to instrument 16 and inserted into hole 29 thereof. The element can be placed in the hole in only one manner, namely, with its pin 15 at the top, since the length of the pin is greater than the diameter of the hole.

If bar 25 is a permanent magnet, the attraction between its magnetic poles and those of element 13 will cause the bar to move in one direction or the other from its normally horizontal position depending on the relative positions of the N and S poles of the element, and the bar will come to rest in a new position. The extent of the movement of the bar from its horizontal position will of course depend on the magnitude of the attractive force between its magnetic poles and those of the magnetic pick-up element, and will therefore depend on the magnetic flux retained by the element after the surge. By suitably calibrating the instrument and by determining in advance to which side its pointer 26 moves from its zero indicating position for a surge current in one direction or the other through conductor 10 in Fig. 1, as hereinafter explained, it will be obvious that pointer 26 will indicate the direction and maximum value of the surge current that flowed through condenser 10.

The above-mentioned calibration and previous determination as to the direction of the surge current may be carried out in the following manner. Pick-up element 13, or one similar thereto, is placed in the manner described adjacent conductor 10, or adjacent any other conductor in the laboratory or field, and a surge current of known direction and known maximum value is sent through the conductor. The pick-up element is then inserted in hole 29 of instrument 16, whereupon pointer 26 will move to one side or the other from its zero indicating position and come to rest in a new position. The scale 21 will then be suitably marked so that pointer 26 in its new position indicates the known maximum value of current sent through conductor 10. By noting to which side of its zero indicating position pointer 26 moves, it becomes known that all surges through conductor 10 in the same direction as that in which this surge of known maximum value was sent through the conductor will produce indications of pointer 26 to this side of its zero indicating position when element 13 is placed in hole 29, whereas surge currents through the conductor in the opposite direction will produce indications of pointer 26 to the other side of its zero indicating position when element 13 is placed in hole 29. The element 13 is then removed from hole 29, demagnetized in any suitable manner known to those skilled in the art, and again placed adjacent conductor 10 in the manner previously described. A surge current is then sent through conductor 10 in the same direction as the previous surge, but having a different maximum value than that of the previous surge. The element 13 is then placed in hole 29 of the instrument and scale 21 suitably marked so that pointer 26 in its new position indicates the known maximum value of the second surge current sent through the conductor. The process described is then repeated until the marking of scale 21 is completed for indications of pointer 26 to that side of its zero indicating position which corresponds to the direction in which the surge currents were sent through conductor 10, and then the process described is repeated with the surge currents sent in the opposite direction through the conductor until the marking of scale 21 is completed for indications of pointer 26 to the opposite side of its zero indicating position.

It should now be evident that when instrument 16 is suitably calibrated and it is determined in advance to which side its pointer 26 moves from its zero indicating position for a surge current in a given direction through conductor 10, or any other conductor, the instrument will, if its bar 25 is a permanent magnet, indicate both the direction and maximum value of the surge current sent through the conductor when element 13 is placed in hole 29 after becoming magnetized by the magnetic flux surrounding the conductor during the surge. If however bar 25 is not a permanent magnet, but is of magnetic material, then the bar may move in either direction from its normally horizontal position when element 13 is inserted in hole 29, irrespective of the relative positions of the magnetic poles of the element. The extent of movement of the bar from its normally horizontal position will however depend on the magnitude of the attractive force exerted thereon by the magnetic poles of the element, and will therefore depend on the magnetic flux retained by the element after the surge. Hence, it should be obvious that if bar 25 is not a permanent magnet, but is of magnetic material, the instrument will, if suitably calibrated, indicate the maximum value of the surge current sent through conductor 10, or any other conductor, when element 13 is placed in hole 29 after becoming magnetized by the magnetic flux surrounding the conductor during the surge. It is clear that one of the great advantages of instrument 16, in addition to its simple and rugged structure, is the fact that it can indicate the maximum value of a surge current, or both the direction and maximum value of a surge current, passing through a conductor remote from the instrument, and give this indication at any time after the occurrence of the surge.

The great commercial value of this advantage will be evident from the following example. Assume that an electric power company operating a long transmission line supported by many towers wishes to determine, with a minimum initial capital expenditure for instruments, the maximum value of the surge current, or both the direction and maximum value of the surge current, that may pass through any one or more of its transmission tower legs or arms due to flashover of line insulators during a lightning storm, or a switching operation. This may be accomplished by placing, in the manner previously described, one of our magnetic pick-up elements, as for example element 13 shown in Fig. 3, adjacent each tower arm, care being taken to have each pick-up element suitably marked with some identifying character to indicate the number of the tower arm it is adjacent to. Only a single instrument 16 is necessary and this may be permanently located in the testing laboratory, or other suitable location in one of the company's buildings. After the lightning storm is over, a patrolman makes a tour of the transmission line system to remove the pick-up elements and bring them to the place where instrument 16 is located. The pick-up elements are then tested in the instrument, and a record made of the tower arm number corresponding to each element and the instrument reading obtained by testing each element. After testing, the magnetized elements may be demagnetized in any suitable manner, and they, together with any elements which did not become magnetized because no surge current passed through their adjacent tower arms, may be replaced in their original positions and used over again. This will be repeated after each lightning storm, thus using the same pick-up elements over and over again, and employing only one instrument to make all the tests. If desired, the patrolman making the tour of the transmission line after each lightning storm can take instrument 16 with him and test each magnetic pick-up element as soon as it is removed. In that case, it will be desirable for the patrolman also to have with him suitable means for demagnetizing each magnetized pick-up element so that he can replace it before he proceeds to the next pick-up element, or else have spare unmagnetized pick-up elements with him to replace those which are magnetized. It is obvious that by employing stop-key 30 in the manner previously described it will be possible to avoid injury to the instrument during transportation, and also to prevent demagnetization of bar 25 during the period the instrument is not used, if the bar is a permanent magnet.

The magnetic pick-up element represented by 35 in Fig. 4 differs from magnetic pick-up element 13 by employing a mass of small particles of a magnetic material possessing a high degree of magnetic retentivity instead of thin laminations of such a material. This mass is represented by 36 and may for example consist of ground particles of hardened cobalt steel. The advantage of pick-up element 35 is that it will have a higher magnetic reluctance and offer a higher resistance to the flow of eddy currents than element 13 because it consists of a great mass of very small oxidized particles insulated from each other by their oxidizing films, the oxidation occurring as the red hot particles come in contact with the air when they are ground from some solid piece. In some cases it will be desirable to employ pick-up element 35 instead of pick-up element 13. It should now be obvious that by employing an appropriate form of our magnetic pick-up element, it is possible to measure the direction and maximum value of a surge current irrespective of the time it takes to reach its maximum value from zero.

Now in the previously assumed case of the power company operating a long transmission line supported by many towers, it may well happen that it will be more economical to invest a greater initial capital expenditure for instruments by installing one adjacent each tower arm, providing that an instrument is available that will reduce the operating expense of making a testing tour after each lightning storm. The instrument represented by 37 in Fig. 5 makes possible this reduced operating expense. Instrument 37 is essentially the same as instrument 16 in Fig. 3, except that its cover 19 has two additional similar spaced apart windows 38 and 39, only a portion of window 39 being shown since the remainder is a part of the broken away portion of the casing, and in addition the instrument has a flag 40 secured to its shaft 24. The dimensions of windows 38 and 39, and of flag 40, and their positions, are such that when pointer 26 indicates zero no part of the flag is visible through either of these windows, and when the pointer moves a small amount in either direction from its zero indicating position a small part of the flag will be visible through one or the other of these windows, the visible portion of the flag increasing with increasing movement of pointer 26 from its zero indicating position until the whole flag is visible through one or the other of these two windows when the pointer has moved the maximum amount to one side or the other of its zero indicating position. The pick-up element 13 is assembled in the hole at the back of shelf 18. The base 17 of the instrument is provided with holes so that the instrument may be secured by bolts 41 and nuts 42 to a bracket 43 so that its magnetic pick-up element 13 is the proper distance from conductor 44 with the axis of the element perpendicular to the axis of the conductor. The relative positions of the instrument, its pick-up element, and conductor 44, are more clearly illustrated in the top view shown in Fig. 6. For the sake of simplicity we have shown conductor 44 as a round wire, but we wish it understood that it may represent any conducting body of any shape through which a surge current may flow.

In the instrument shown in Fig. 5 the magnetic flux surrounding conductor 44 during a current surge therethrough has practically no magnetic influence on bar 25 whether the latter is or is not a permanent magnet, because its axis is parallel to the axis of conductor 44. From the explanation given in connection with the instrument shown in Fig. 3, it will be obvious that pointer 26 will indicate zero when element 13 is substantially unmagnetized, and that after a surge current flows through conductor 44, the pointer will indicate only the maximum value of the surge current if bar 25 is not a permanent magnet, or indicate the direction and maximum value of the surge current if bar 25 is a permanent magnet. In addition, however, by making windows 38 and 39 and flag 40 sufficiently large, and preferably painting the front face of the flag with some paint which makes it easily visible from a comparatively great distance, it is possible for the patrolman to determine from the ground whether or not pointer 26 has moved from its zero indicating position, even though the instrument is located fairly high above the ground. It is therefore readily possible for the patrolman to tour the transmission line system in a rapidly moving automobile or motorcycle and glance at each instrument as he approaches it, and if he sees no portion of the flag visible he immediately knows that no surge current has passed through its adjacent conductor and he therefore proceeds without delay towards the next instrument. If however, the patrolman sees a portion or all of the flag of the instrument he is passing, then he stops, climbs the tower, notes and records the indication of its pointer, removes its pick-up element 13, and either demagnetizes this element and reinserts it in its proper place, or else substitutes another substantially unmagnetized pick-up element therefor. Since surge currents will ordinarily flow through only a small portion of the various conductors 44 to which the instruments are adjacent during any one lightning storm, and since the patrolman has to climb only those towers and has to record the indications of only those instruments whose adjacent conductors were traversed by a surge current, it is possible for the patrolman to conduct the tour in the minimum amount of time, and therefore in the most economical manner.

With the instruments so far described it is necessary to take care that the distance between the magnetic pick-up element and the conductor which is traversed by the surge current is the same as that in effect when the instrument was calibrated, otherwise the latter will give erroneous indications. Ordinarily, this will not occur, since usually there is no movement of the conductor traversed by the surge current, nor any movement of the structure supporting the magnetic pick-up element only, or supporting the instrument with the magnetic pick-up element. However, it is desirable to have an instrument which prevents any possible erroneous readings due to a change in the distance between the magnetic pick-up element and the conductor traversed by the surge current. The instrument represented by 45 in Fig. 7 is that type of instrument. This instrument is the same as the one shown in Fig. 5, but in addition has a semi-circular conducting strap 46 secured to it at the back of shelf 18 at a predetermined distance from pick-up element 13. This strap is secured to the shelf by bolts 47 and nuts 48, and the strap is connected in series with the conductor through which the surge current flows. This conductor is represented by 49 and is clamped to the strap by nuts 48. The instrument will be calibrated with conducting strap 46 assembled as shown, and will be secured to some suitable bracket, such as shown in Fig. 5 for example, the holes in the base 17 of the instrument being represented by 50 in Fig. 7. The instrument will operate in the same manner as that shown in Fig. 5, but will have the additional advantage that it cannot give erroneous indications due to a change in the distance between its pick-up element 13 and strap 46 after it is calibrated, since this distance is permanently fixed by the instrument structure.

In Fig. 8, we illustrate an embodiment of our instrument which does not use springs to provide the restraining torque for its rotatable element. This instrument is represented by 51. A three-arm bracket 52 has its back arm secured to the inside of shelf 18 and has its other two arms provided with suitable bearings in which is rotatably or pivotally mounted a disk 53 made of magnetic material possessing a high degree of magnetic retentivity, and permanently magnetized along a diameter to have diametrically opposite N and S poles at its circumference, as shown. The cover 19 and disk 53 are so mounted that they can be quickly removed and replaced. Secured to the inside of shelf 18 is a C-shaped permanent magnet 54 whose opposite legs have N and S poles as shown. Magnet 54 is mounted in a horizontal position with its plane passing through the axis of conductor 44 and the center of disk 53 and with the ends of its opposite legs separated by a small air-gap from the disk. Due to magnetic attraction between the magnetic poles of disk 53 and magnet 54, the disk assumes a normally stationary position with its magnetic axis in line with the magnetic poles at the legs of magnet 54. The front face of disk 53 is divided into two sectors 55 and 56 which are painted with sharply contrasting colors. For example, sector 55 is painted black and sector 56 is painted white, except for the black painted divisions and numbers forming a scale near a portion of its periphery. This scale is of the zero center type, having similarly marked graduations on both sides of its zero mark. The front arm of bracket 52 has a pointer 57 cooperating with the scale on the disk, and also has a window 58 registering with a window on cover 19. This cover window is not shown in Fig. 8 since it is on the broken away portion of the cover, but is shown in Fig. 11 where it is represented by 59. It is therefore obvious that pointer 57 and a portion of the disk scale is visible through window 59. The scale on disk 53 is marked so that pointer 57 registers with the zero mark when the disk is in its normally stationary position. Cover 19 also has a window 60 of such shape and dimensions that only the black painted sector 55 of the disk is visible through this window when the disk is in its normally stationary position, and when the disk moves an appreciable amount from this position in either direction a portion of the white painted sector 56 becomes visible through this window, the portion of sector 56 visible through window 60 increasing with increasing movement of the disk from this position. Instrument 51 is so positioned that the axis of conductor 44 is substantially parallel to the two parallel legs of magnet 54. The relative positions of conductor 44, disk 53 and magnet 54 are more clearly illustrated in Fig. 9.

Now as long as no surge current passes through conductor 44 the disk 53 remains in its normally stationary position, hence pointer 57 indicates zero and only the black painted sector 55 is visible through window 60. If however a surge current flows through conductor 44 in the direction shown for example by arrow 61, then the magnetic flux surrounding the conductor during the surge has substantially no magnetic influence on magnet 54, but does tend to magnetize disk 53 along a diameter perpendicular to its permanent magnetic axis. This can be clearly understood from Fig. 9, where 62 represents the lines of force of the magnetic flux surrounding conductor 44 during the surge. This causes the strength of the magnetic field of the disk to change from its original value and the axis of this magnetic field to change from its original direction. Thus, assume that line BC in Fig. 10 represents the direction and magnitude of the original magnetic field of the disk before the surge, pointer 57 in Fig. 8 indicating zero under this condition. Also assume that line BD in Fig. 10 represents the direction and magnitude of the magnetic field retained by the disk due to the surge current flowing through conductor 44 in the direction shown by arrow 61 in Fig. 8. It is clear that after the surge is over the direction and magnitude of the magnetic field of the disk will be approximately the resultant of its original and surge magnetizations, and may therefore, for example, be represented by BE. Since the surge magnetic flux due to the surge current in the direction of arrow 61 tends to produce an S pole at the top of disk 53 and an N pole at the bottom of the disk, the resultant S and N poles of the disk will be shifted clockwise of their original positions, hence the disk will move counter-clockwise from its normally stationary position, and come to rest where its new magnetic poles line up with the magnetic poles of magnet 54. The extent of the movement of the disk from its normally stationary position depends on the strength of the surge magnetization of the disk because this determines the magnetic axis of the disk after the surge, and therefore the extent of the disk movement depends on the maximum value of the surge current that flowed through conductor 44. It should now be clear that if the surge current had flowed through conductor 44 in the opposite direction, then the surge magnetization of the disk would be represented by BF in Fig. 10, and the approximate resultant magnetization of the disk would, for example, be represented by BH in this figure, hence the disk would move clockwise from its normally stationary position and come to rest with its new magnetic poles in line with the magnetic poles of magnet 54. In order to obtain accurate indications, the original magnetization of disk 53 should be stronger than the maximum expected magnetization thereof due to a surge current. Ordinarily, it will be satisfactory to make disk 53 out of cobalt steel with a thickness of .005 inch to .010 inch, but both the material out of which the disk is made and its thickness should be selected with reference to the characteristic of the surge current it is expected to measure. In general, the faster the surge current reaches its maximum value from zero the thinner should the disk be made. It is obvious that by suitably calibrating the scale of the instrument the latter will indicate the direction and maximum value of a surge current flowing through conductor 44. The calibration of the instrument may be carried out in the manner described in connection with the instrument illustrated in Fig. 3, care being taken that after each sending of a surge current of known maximum value and direction through conductor 44 and the marking of the scale of the disk to have pointer 57 indicate this maximum value, the disk should be removed from the instrument, demagnetized in any suitable manner and remagnetized so as to have its original magnetic flux strength in its original direction and then replaced in the instrument, whereby pointer 57 will again indicate zero before the next surge current of known maximum value and direction is sent through conductor 44.

Since no portion of the white painted sector 56 of disk 53 in the instrument shown in Fig. 8 is visible through window 60 until after a surge current has passed through conductor 44, it will be readily possible for an observer to determine when quite far from the instrument whether or not a surge current has passed through the conductor by merely looking at window 60 to see whether or not any white painted portion of the disk is visible therethrough. It should therefore be obvious that the instrument illustrated in Fig. 8 has all the advantages of, and may be used in the manner described in connection with the instrument illustrated in Fig. 5, it being remembered that after each current surge through conductor 44 the patrolman should demagnetize disk 53 and remagnetize it to its original condition, as described in connection with the calibration of the instrument, or else replace the disk with another properly magnetized disk.

The instrument illustrated in Fig. 11 and represented generally by 63 is essentially the same as that illustrated in Fig. 8, but in addition has an approximately C shaped conducting rod 64 passing through holes in bosses 65 of shelf 18 and cover 19, the ends of the rod being threaded. Rod 64 is secured to the instrument by nuts 66. Secured to rod 64 are two collars 67 which abut bosses 65 on shelf 18 so as to prevent the curved portion of the rod being drawn through the holes in these bosses, thereby preventing undue strains on these bosses when nuts 66 are being tightened to secure the rod to the instrument. Only one of bosses 65 on shelf 18 is shown, the other boss being omitted to show the clearest possible view of the instrument. Rod 64 will be connected in series with the conductor through which flows the surge current it is desired to measure, as shown for example in Fig. 7. The instrument in Fig. 11 will operate in the same manner as that shown in Fig. 8, and will have the additional advantage that it cannot give erroneous indications due to a change in the distance between rod 64 and disk 53 after it is calibrated, since this distance is permanently fixed by the instrument structure.

In Fig. 12 we illustrate another embodiment of our instrument represented generally by 68. This instrument consists of a back plate 69 and a cover 70 removably secured thereto by suitable means (not shown), both parts being preferably made of non-magnetic material. Secured to the inside of plate 69 by lugs 71 and screws 72 is a thin, flat, arcuate strip of magnetic material 73 possessing a high degree of magnetic retentivity, the strip being preferably made circular in shape but not forming a complete circle so that it has its two ends separated a predetermined amount. A similar strip 74 is rotatably or pivotally mounted in suitable stationary parts of the instrument so as to be concentric with strip 73. Secured to and movable with strip 74 is a combined indicating pointer 75 and flag 76, the flag being shown partly in full and partly in dotted lines. Pointer 75 is adapted to sweep over a graduated scale 77 that is secured to cover 70 by suitable means (not shown). A spiral spring 78 is arranged to resist movement of the movable element 74, 75 and 76 in a clockwise direction. A conducting rod 79 passes through the instrument so as to be almost surrounded by strips 73 and 74, this rod being preferably surrounded by an insulating sleeve 80 inside of the instrument. Rod 79 is threaded at its ends and is secured to the instrument by nuts 81. Rod 79 is connected in series with the conductor through which flows the surge current it is desired to measure, this conductor being represented for example by 82. Cover 70 has a window 83 through which is visible pointer 75 and scale 77, and has another window 84 so positioned that flag 76 is not visible therethrough when pointer 75 indicates zero but becomes visible therethrough in increasing amounts as the pointer moves from its zero indicating position in a clockwise direction. Windows 83 and 84 are only partly shown in Fig. 12, the remainder of the windows being part of the broken away portion of the cover, but these windows are clearly shown in Fig. 13. Stationary strip 73 and the movable element 74, 75 and 76 are so positioned that when the strips are substantially unmagnetized the pointer 75 indicates zero, no part of flag 76 is visible through window 84, and the right-hand end of strip 73 overlaps the corresponding end of strip 74, whereas the left-hand end of strip 74 overlaps the corresponding end of strip 73. A coil 85 surrounds strips 73 and 74 in such a manner as not to interfere with the movement of strip 74. The coil ends are brought out through the instrument cover and are represented by 86.

As long as no surge current flows through rod 79, pointer 75 indicates zero and no part of flag 76 is visible, but when a surge current flows through the rod in either direction, the magnetic flux surrounding the latter during the surge magnetizes strips 73 and 74, the strips remaining magnetized after the surge is over because of their magnetic retentivity. The strips become so magnetized that magnetic forces are set up between them which cause strip 74 to rotate in a clockwise direction. Thus, if, for example, a surge current flows through rod 79 in the direction shown by arrow 87, strips 73 and 74 will be magnetized so that their left-hand ends will be N poles and their right-hand ends will be S poles, whereas if the surge current flows in the opposite direction, these polarities will be reversed, but in either case the magnetic forces set up between the strips due to their overlapping ends having similar magnetic poles, cause strip 74 to rotate in a clockwise direction, hence causing pointer 75 to move from its zero indicating position and flag 76 to become visible through window 84. The extent of movement of pointer 75 from its zero indicating position will depend on the magnitude of the fluxes retained by strips 73 and 74, and this in turn will depend on the maximum value of the surge current which flowed through rod 79. Ordinarily, it will be satisfactory to make strips 73 and 74 out of cobalt steel with a thickness of .005'' to .010'', but both the material of which the strips are made and their thickness should be selected with reference to the characteristic of the surge currents it is expected to measure. In general, the faster the surge current reaches its maximum value from zero, the thinner the strips 73 and 74 should be made. It is clear that by suitably calibrating scale 77 of the instrument the latter will indicate the maximum value of a surge current passing through rod 79, but will not indicate the direction of the surge. This calibration may be carried out in the manner described in connection with the instrument illustrated in Fig. 3, except that the different surges of known maximum value need be sent through rod 79 in only one direction. After each sending of a surge current of known maximum value through rod 79 and the marking of the scale to have pointer 75 indicate this maximum value, the strips 73 and 74 should be demagnetized by connecting ends 86 of coil 85 to a source of alternating current voltage and gradually decreasing to zero the voltage impressed on the coil, whereby pointer 75 will again indicate zero before the next surge current of known maximum value is sent through rod 79. This, for example, may be done by connecting the coil ends to a magneto and rotating the armature of the magneto at a gradually decreasing speed till it is stopped altogether.

Since no portion of flag 76 is visible through window 84 until after a surge current has passed through rod 79, it will readily be possible for an observer to determine when quite far from the instrument whether or not a surge current has passed through rod 79 by merely looking at window 84 to see whether or not the flag is visible. It should therefore be obvious that the instrument illustrated in Fig. 12 has all the advantages of, and may be used in the manner described in connection with, the instrument illustrated in Fig. 5, it being remembered that after each current surge through rod 79, the patrolman should demagnetize strips 73 and 74 as described in connection with the calibration of the instrument.

The instrument illustrated in Fig. 13 and represented generally by 88 is similar to that illustrated in Fig. 12, except that it has no conducting rod secured thereto, the conductor 82 passing directly through the instrument with insulating sleeve 80 surrounding the conductor where it passes through the instrument. Obviously, instrument 88 operates in the same manner as instrument 68 in Fig. 12. It will also be clear that both instruments possess the advantage that they cannot give erroneous indications due to a change in the distance between strips 73 and 74 and the conductor passing through the instrument after the latter is calibrated, since in both instruments this distance is permanently fixed by the instrument structure.

In Fig. 14 we illustrate another form of apparatus that may be employed for carrying out our method of testing the magnetic flux retained by any form of our magnetic pick-up element so as to determine the maximum value and direction of a current surge through a conductor. The apparatus illustrated in Fig. 14 is a well known form of ballistic galvanometer and, therefore, its structure and operation will be briefly described. This galvanometer consists of a stationary coil 89 having a hole 90, a stationary permanent magnet 91 having pole pieces of the shape and polarities shown, and an armature winding 92 on a drum 93 that is rotatably mounted between the pole pieces of the magnet. This drum is suspended from a wire 94 which is secured at its upper end to a stationary adjustable screw 95. One end of a spring 96 is secured to the bottom of the drum, and the other end of the spring is connected to a stationary adjustable screw 97. Wire 94 and spring 96 are also electrically connected to opposite ends of armature winding 92, thus connecting the latter in series with coil 89. A shunting resistance 98 is connected across coil 89. A stationary incandescent lamp 99 has a thin straight filament 100, the lamp being connected to a suitable energizing source (not shown). Light from this lamp falls on a suitable stationary lens 101 which focuses a narrow vertical ray of light on a mirror 102 carried by wire 94, the mirror reflecting this ray of light on a stationary ground glass graduated scale 103 of the zero center type. By suitably adjusting screws 95 and 97 the ray of light reflected from mirror 102 can be made to fall on the zero mark of scale 103 when drum 93 is in its normally stationary position.

Any form of our magnetic pick-up element may be used with this ballistic galvanometer for determining the maximum value and direction of a current surge through a conductor. For example, assume that it is desired to use pick-up element 13 shown in Fig. 3 for determining the maximum value and direction of a current surge through conductor 10 in Fig. 1. Pick-up element 13 will be placed adjacent conductor 10 as explained in connection with Fig. 3. Assume that a surge current flows through conductor 10 in the direction shown by the arrows thereon. After the surge is over the element will be inserted in hole 90 of coil 89 as shown in Fig. 14. The diameter of this hole is such as to allow the body of the pick-up element to pass readily therethrough but not to permit pin 15 of the element to pass through. Element 13 should be so positioned in hole 90 that the lengths of its laminations protruding above and below the coil are substantially equal. This can be accomplished by suitably positioning an adjustable slide 104 on which element 13 rests. By pulling slide 104 in the direction shown by arrow 105 the element 13 drops down through hole 90, thus causing a continually decreasing intensity of flux from the element to thread coil 89 until the element clears the hole. This induces a voltage in coil 89 which causes a current to flow through armature winding 92, thus causing drum 93 to rotate and the ray of light on scale 103 to move to one side or the other from its zero indicating position. Assume, for example, that the ray of light on scale 103 moves to the right from its zero indicating position. The extent of the movement of the ray of light on scale 103 from its zero indicating position will depend on the magnetic flux retained by element 13 after the surge, and will, therefore, depend on the maximum value of the surge current that flowed through conductor 10. If the surge current had flown through conductor 10 in the opposite direction to that assumed, the ray of light on scale 103 would have moved to the left of its zero indicating position. It is clear that by suitably calibrating scale 103 and predetermining in advance to which side of its zero indicating position the ray of light on the scale will move for a surge current in a given direction through conductor 10, the ballistic galvanometer will indicate the maximum value and direction of a current surge through conductor 10, or through any other conductor. This calibration and previous determination as to the direction of the surge current may be carried out in the manner explained in connection with the instrument illustrated in Fig. 3. It is obvious that since pin 15 of pick-up element 13 cannot pass through hole 90 of coil 89, the element will invariably be placed with the pin below the coil; i. e., will always be placed in the same position, and since there will be substantially no variation in the time it takes for different pick-up elements to drop down through hole 90, the galvanometer will always accurately indicate the direction as well as the maximum value of the surge current.

As explained in the example described in connection with Fig. 3, any number of magnetic pick-up elements may be placed at different points on a transmission system and after a lightning storm they may be removed by a patrolman, brought into the laboratory of the power company where the ballistic galvanometer is located, and tested, or the patrolman may take the galvanometer with him on his tour and test the pick-up elements in the field.

In addition to the desirability of determining the maximum value of an electric current surge passing through a conductor, it is also frequently desirable to determine the time elements and the wave shape of the surge. By the term "time elements" is meant, first, the time it takes for the surge to rise from zero to its maximum value, and second, the time it takes for the surge to rise from zero to its maximum value and then decrease to half its maximum value. For example, the two time elements of the surge current represented by KL in Fig. 2 are 1 micro-second and 5 micro-seconds, respectively. In practically all cases the wave shape of a surge current may be quite accurately determined when its time elements are known. We will now describe our method of determining the time elements and the wave shape of an electric current surge passing through a conductor, e. g., conductor 10 in Fig. 1.

Adjacent conductor 10, we so place two or more magnetic pick-up elements possessing different degrees of magnetic retentivity that each becomes permanently magnetized by the magnetic flux surrounding the conductor during the surge. Thus, in Fig. 1 we show, for example, three such elements consisting of laminations 12, 106 and 107, respectively, positioned equal distances from conductor 10. The laminations of each element will be confined within a container of non-magnetic material, as shown in Fig. 3, but these containers and the supporting means therefor have been omitted from Fig. 1 in order to give the clearest possible view. Assume, for example, that the fastest surge current it is expected will flow through conductor 10 is a ½–5 micro-second surge. The laminations of at least one magnetic element should be sufficiently thin so that when a ½–5 micro-second surge flows through conductor 10 the eddy currents flowing in the laminations during the current surge will be so negligibly small that it will retain substantially the same magnitude of flux after this surge is over as it would retain after a direct current having a constant value equal to the maximum value of this surge is sent through the conductor. Assume that such an element is represented by laminations 12, each lamination being .005" thick. The eddy currents flowing in laminations 12 decrease in magnitude as surges slower than a ½–5 micro-second are sent through conductor 10, and with a direct current having a constant value flowing through the conductor there are no eddy currents flowing in the laminations. From this it will be clear that the magnitude of the flux retained by laminations 12 will be substantially independent of the time elements and the wave shape of the surge current within the range of surges it is expected to measure and will practically depend only on the maximum value of the surge current. The laminations of the other two magnetic elements should be sufficiently thick so that progressively larger eddy currents flow therein during a ½–5 micro-second surge. Assume that this condition is satisfied when each of laminations 106 and 107 are .025" and .040" thick, respectively, these two sets of laminations constituting the other two magnetic elements.

A direct current having a constant value is then sent through conductor 10 in the direction shown by the arrows thereon, after which the magnetic elements are removed and individually tested, in the manner previously described, by means of our instrument shown in Fig. 3, or by means of the ballistic galvanometer shown in Fig. 14. The magnetic elements are then demagnetized, replaced adjacent conductor 10, and the above test repeated with direct currents having different constant values sent through the conductor until readings have been obtained covering the range of maximum values of the surge currents it is expected will flow through the conductor. Thus, as shown for example in the first set of readings given below, these readings have been taken from 100 to 85 amperes, inclusive, in steps of 5 amperes. Of course, the number of readings shown is only illustrative of the principle, since ordinarily a much larger range of readings will be taken. From this first set of readings it is seen that for any given value of direct current sent through conductor 10, all three magnetic elements produced the same instrument reading. This result is obtained by suitably selecting the number and lengths of the laminations in the three elements and suitably positioning them at the same or at different distances from conductor 10 so that they will have the same magnetic strengths after a given value of direct current is sent through the conductor, if they are to be tested in the same instrument; or that they will have corresponding unequal magnetic strengths if they are to be tested with differently calibrated instruments. The above tests are then repeated with surge currents whose time elements and wave shapes vary over the range of the time elements and wave shapes of the surge currents it is expected will flow through conductor 10. Below are given the three sets of readings illustrative of the principles outlined:

*Direct current with different constant values*

| Current sent through conductor 10 | Instrument reading with laminations 12 | Instrument reading with laminations 106 | Instrument reading with laminations 107 |
|---|---|---|---|
| 100 | 100 | 100 | 100 |
| 95 | 95 | 95 | 95 |
| 90 | 90 | 90 | 90 |
| 85 | 85 | 85 | 85 |

*1–5 Micro-second surge*

| Maximum value of current sent through conductor 10 | Instrument reading with laminations 12 | Instrument reading with laminations 106 | Instrument reading with laminations 107 |
|---|---|---|---|
| 100 | 100 | 95 | 90 |
| 95 | 95 | 90 | 85 |
| 90 | 90 | 85 | 80 |
| 85 | 85 | 80 | 75 |

*½–5 Micro-second surge*

| Maximum value of current sent through conductor 10 | Instrument reading with laminations 12 | Instrument reading with laminations 106 | Instrument reading with laminations 107 |
|---|---|---|---|
| 100 | 100 | 90 | 85 |
| 95 | 95 | 85 | 80 |
| 90 | 90 | 80 | 75 |
| 85 | 85 | 75 | 70 |

Of course, the number of sets of readings shown are only illustrative of the principle, since ordinarily more than three sets of readings will be taken. In the second and third sets of readings, it is seen that only laminations 12 produced instrument readings equal to the maximum values of the current surge, whereas laminations 106 produced instrument readings lower than the maximum values of the current surge, and laminations 107 produced still lower instrument readings. The reason for this is the absence of appreciable eddy currents in laminations 12 during a surge and the existence of appreciable eddy currents in laminations 106, and still higher eddy currents in laminations 107, during a surge.

Now, assume that the above tests have been made, the magnetic elements demagnetized and placed adjacent conductor 10 as shown in Fig. 1. Further assume that a 1–5 micro-second surge current having a maximum value of 100 amperes flows through conductor 10 in the direction shown by the arrows thereon, that neither the maximum value nor the time elements and wave shape of this surge is known, and that it is desired to determine all of these factors. After the surge is over, the three magnetic elements are removed and separately tested as previously described. Laminations 12 will produce an instrument reading of 100, thus showing that the maximum value of the surge current was 100 amperes, because it is known that the magnitude of the flux retained by these laminations is substantially independent of the time elements and wave shape of the surge within the range of surges to be measured. Laminations 106 and 107 will produce instrument readings of 95 and 90, respectively. By examining the three sets of readings it is found that only after a 1–5 micro-second surge will laminations 12 produce an instrument reading of 100 and laminations 106 and 107 simultaneously produce instrument readings of 95 and 90, respectively, thus proving that it was a 1–5 micro-second surge that passed through conductor 10. Of course, it is unnecessary to use both laminations 106 and 107, since it is clear that the time elements and wave shape may be determined by using laminations 12 and either laminations 106 or 107. However, it will usually be desirable to employ both laminations 106 and 107, since this will result in check readings on the time elements and wave shape, thus insuring more reliable results. It will now be obvious that we have provided a simple and reliable method of determining not only the direction and maximum value of an electric current surge passing through a conductor, but also of determining the time elements and wave shape of the surge.

In accordance with the provisions of the patent statutes, we have described the principles of operation of our invention, together with the apparatus which we now consider to represent the best embodiments thereof, but we desire to have it understood that the apparatus shown and described is only illustrative and that the invention may be carried out by other means.

What we claim as new and desire to secure by Letters Patent of the United States, is:

1. An instrument for measuring and indicating the maximum value of an electric current surge that flowed through a conducting body, said instrument comprising a stationary member, a movable member in a normally stationary position, one of said members consisting of a magnetic body possessing a high degree of magnetic retentivity and so positioned relatively to said conducting body that the magnetic flux in the space surrounding the latter due to the current flow therethrough effects the magnetization of this magnetic body, and the other of said members consisting of a magnetic element so positioned relatively to said conducting body and to said magnetic body that the magnetization of the latter effects a movement of said movable member from its normally stationary position to a different stationary position, and means operatively associated with said movable member for indicating the movement thereof from its normally stationary position.

2. An instrument for measuring and indicating the maximum value of an electric current surge that flowed through a conducting body, said instrument comprising an electrical conductor adapted to be connected in series relation with said conducting body, a stationary member, a movable member in a normally stationary position, one of said members consisting of a magnetic body possessing a high degree of magnetic retentivity and so positioned relatively to said conductor that the magnetic flux in the space surrounding the latter due to the current flow therethrough effects the magnetization of this magnetic body, and the other of said members consisting of a magnetic element so positioned relatively to said conductor and to said magnetic body that the magnetization of the latter effects a movement of said movable member from its normally stationary position to a different stationary position, and means operatively associated with said movable member for indicating the movement thereof from its normally stationary position.

3. An instrument for measuring and indicating the maximum value of an electric current surge that flowed through a conducting body, said instrument comprising a stationary magnetic body possessing a high degree of magnetic retentivity and so positioned relatively to said conductitng body that the magnetic flux in the space surrounding the latter due to the current flow therethrough effects the magnetization of this magnetic body, a movable magnetic element in such a normally stationary position relatively to said conducting body and to said stationary magnetic body that the magnetization of the latter effects a movement of this movable element from its normally stationary position to a different stationary position, a fixed graduated scale, and a movable indicating pointer actuated by said movable element and adapted to sweep over said scale.

4. An instrument for measuring and indicating the maximum value of an electric current surge that flowed through a conducting body remote from the instrument, said instrument comprising a rotatably mounted movable bar of magnetic material in a normally stationary position, a magnetic body possessing a high degree of magnetic retentivity and so positioned adjacent to said conducting body that the magnetic flux in the space surrounding the latter due to the current flow therethrough effects the magnetization of this magnetic body, said instrument being adapted to receive said magnetic body in a position where its magnetic axis is at an angle to the longitudinal axis of said movable bar when the latter is in its normally stationary position, and means operatively associated with said movable bar for indicating the movement thereof from its normally stationary position.

5. An instrument for measuring and indicating the maximum value and direction of an electric current surge that flowed through a conducting body remote from the instrument, said instrument comprising a rotatably mounted movable permanent bar magnet in a normally stationary position, a plurality of strips of magnetic metal possessing a high degree of magnetic retentivity and so positioned adjacent to said conducting body that the magnetic flux in the space surrounding the latter due to the current flow therethrough effects the magnetization of these strips, said instrument being adapted to receive said strips in a position where their magnetic axes are substantially perpendicular to the magnetic axis of said magnet when the latter is in its normally stationary position, a fixed graduated scale, and an indicating pointer secured to said magnet, said pointer being adapted to sweep over said scale and having a normally stationary position at approximately the center of the scale.

6. An instrument for measuring and indicating the maximum value and direction of an electric current surge that flowed through a conducting body remote from the instrument, said instrument comprising a rotatably mounted movable permanent bar magnet in a normally stationary position, a magnetic pick-up element so positioned adjacent to said conducting body that the magnetic flux in the space surrounding the latter due to the current flow therethrough effects the magnetization of this element, said pick-up element consisting of a mass of small particles of a magnetic material possessing a high degree of magnetic retentivity and enclosed within a container of non-magnetic material, said instrument being adapted to receive said pick-up element in a position where the magnetic axis of said mass of particles is substantially perpendicular to the magnetic axis of said magnet when the latter is in its normally stationary position, a fixed graduated scale, and an indicating pointer secured to said magnet, said pointer being adapted to sweep over said scale and having a normally stationary position at approximately the center of the scale.

7. An instrument for measuring and indicating the maximum value of an electric current surge that flowed through a conducting body, said instrument comprising a rotatably mounted movable bar of magnetic material in such a normally stationary position relatively to said conducting body that the magnetic flux in the space surrounding the latter due to the current flow therethrough has substantially no magnetic influence on this bar, a stationary magnetic body possessing a high degree of magnetic retentivity and so positioned relatively to said movable bar and to said conducting body that the magnetic flux in the space surrounding the latter due to the current flow therethrough effects the magnetization of this magnetic body with its magnetic axis at an angle to the longitudinal axis of the movable bar when the latter is in its normally stationary position, and means operatively associated with said movable bar for indicating the movement thereof from its normally stationary position.

8. An instrument for measuring and indicating the maximum value and direction of an electric current surge that flowed through a conducting body, said instrument comprising a rotatably mounted movable permanent magnet in such a normally stationary position relatively to said conducting body that the magnetic flux in the space surrounding the latter due to the current flow therethrough has substantially no magnetic influence on this magnet, a plurality of stationary strips of magnetic material possessing a high degree of magnetic retentivity and so positioned relatively to said magnet and to said conducting body that the magnetic flux in the space surrounding the latter due to the current flow therethrough effects the magnetization of these strips with their magnetic axes substantially perpendicular to the magnetic axis of said magnet when the latter is in its normally stationary position, a fixed graduated scale, and an indicating pointer secured to said magnet, said pointer being adapted to sweep over said scale and having a normally stationary position at approximately the center of the scale.

9. An instrument for measuring and indicating the maximum value and direction of an electric current surge that flowed through a conducting body, said instrument comprising a rotatably mounted movable permanent magnet in such a normally stationary position relatively to said conducting body that the magnetic flux in the space surrounding the latter due to the current flow therethrough has substantially no magnetic influence on this magnet, a stationary magnetic pick-up element so positioned relatively to said magnet and to said conducting body that the magnetic flux in the space surrounding the latter due to the current flow therethrough effects the magnetization of this element with its magnetic axis substantially perpendicular to the magnetic axis of said magnet when the latter is in its normally stationary position, said pick-up element consisting of a mass of small particles of a magnetic material possessing a high degree of magnetic retentivity and enclosed within a container of non-magnetic material, a fixed graduated scale, and an indicating pointer secured to said magnet, said pointer being adapted to sweep over said scale and having a normally stationary position at approximately the center of the scale.

10. An instrument for measuring and indicating the maximum value and direction of an electric current surge that flowed through a conducting body, said instrument comprising a stationary magnet so positioned relatively to said conducting body that the magnetic flux in the space surrounding the latter due to the current flow therethrough has substantially no magnetic influence on this magnet, a rotatably mounted disc of magnetic material possessing a high degree of magnetic retentivity and permanently magnetized along a given diameter, said disc being so positioned relatively to said magnet and to said conducting body that it assumes a normally stationary position with its permanent magnetic axis substantially in line with the magnetic poles of this magnet and becomes magnetized along a diameter other than the first mentioned diameter by the magnetic flux in the space surrounding this conducting body due to the current flow therethrough, and means operatively associated with said disc for indicating the movement thereof from its normally stationary position.

11. An instrument for measuring and indicating the maximum value of an electric current surge that flowed through a conducting body, said instrument comprising two arcuate strips of magnetic material positioned with their ends adjacent to each other, at least one of said strips possessing a high degree of magnetic retentivity, one of said strips being stationary and the other of said strips being rotatably mounted and having a normally stationary position, said strips being so positioned relatively to each other and to said conducting body that the magnetic flux in the space surrounding the latter due to the current flow therethrough effects the magnetization of these strips so that magnetic forces are set up between their adjacent ends in a direction to move said rotatably mounted strip from its normally stationary position to a different stationary position, and means operatively associated with said rotatably mounted strip for indicating the movement thereof from its normally stationary position.

12. An instrument for measuring and indicating the maximum value of an electric current surge that flowed through a conducting body, said instrument comprising two adjacent concentric arc shaped strips of magnetic material possessing a high degree of magnetic retentivity, one of said strips being rotatably mounted and having a normally stationary position, and the other of said strips being stationary and positioned with its plane substantially parallel to the plane of said rotatable strip, said strips being so positioned relatively to each other that one end of said stationary strip is adjacent to and overlaps one end of said rotatable strip and the other end of said stationary strip is adjacent to and is overlapped by the other end of this rotatable strip, a conductor adapted to be connected in series with said conducting body, said conductor being positioned so that it is partly surrounded by said strips and so that its axis is substantially parallel to the planes of said strips, a fixed graduated scale, and an indicating pointer secured to said rotatably mounted strip, said pointer being adapted to sweep over said scale.

13. An instrument for giving an indication that an electric current surge has flowed through a conducting body, said instrument comprising a stationary member, a movable member having a normally stationary position, one of said members consisting of a magnetic body possessing a high degree of magnetic retentivity and so positioned relatively to said conducting body that the magnetic flux in the space surrounding the latter due to the current flow therethrough effects the magnetization of this magnetic body, and the other of said members consisting of a magnetic element so positioned relatively to said conducting member and to said magnetic body that the magnetization of the latter effects a movement of said movable member from its normally stationary position to a different stationary position, and means responsive to the operation of said movable member for giving an indication which is visible at a comparatively large distance from the instrument and which indicates whether or not the movable member has moved away from its normally stationary position.

14. An instrument for giving an indication that an electric current surge has flowed through a conducting body, said instrument comprising a stationary member, a movable member having a normally stationary position, one of said members consisting of a polarized magnet so positioned relatively to said conducting body that the magnetic flux in the space surrounding the latter due to the current flow therethrough has substantially no magnetic influence on this magnet, and the other of said members consisting of a magnetic body possessing a high degree of magnetic retentivity and so positioned relatively to said conducting body that the magnetic flux in the space surrounding the latter due to the current flow therethrough effects the magnetization of this magnetic body, said members being so positioned relatively to each other that the magnetization of said magnetic body effects a movement of said movable member from its normally stationary position to a different stationary position, an indicating element secured to said movable member, and means for making said indicating element invisible when said movable member is in its normally stationary position and visible when this movable member has moved away from its normally stationary position.

15. An instrument for giving an indication that an electric current surge has flowed through a conducting body, said instrument comprising a stationary magnet so positioned relatively to said conducting body that the magnetic flux in the space surrounding the latter due to the current flow therethrough has substantially no magnetic influence on this magnet, a rotatably mounted disc of magnetic material possessing a high degree of magnetic retentivity and permanently magnetized along a given diameter, said disc being so positioned relatively to said magnet and to said conducting body that it assumes a normally stationary position with its permanent magnetic axis in line with the magnetic poles of said magnet and becomes magnetized along a diameter other than the first mentioned diameter by the magnetic flux in the space surrounding this conducting body due to the current flow therethrough, and means responsive to the rotation of said disc for giving an indication which is visible at a comparatively large distance from the instrument and which indicates whether or not the disc has moved away from its normally stationary position.

16. An instrument for giving an indication that an electric current surge has flowed through a conducting body, said instrument comprising two arcuate strips of magnetic material positioned with their ends adjacent to each other, at least one of said strips possessing a high degree of magnetic retentivity, one of said strips being stationary and the other of said strips being rotatably mounted and having a normally stationary position, said strips being so positioned relatively to each other and to said conducting body that the magnetic flux in the space surrounding the latter due to the current flow therethrough effects the magnetization of these strips so that magnetic forces are set up between their adjacent ends in a direction to move said rotatably mounted strip from its normally stationary position to a different stationary position, and means responsive to the rotation of said rotatably mounted strip for giving an indication which is visible at a comparatively large distance from the instrument and which indicates whether or not the rotatably mounted strip has moved away from its normally stationary position.

17. An instrument for giving an indication that an electric current surge has flowed through a conducting body, said instrument comprising two adjacent arcuate strips of magnetic material possessing a high degree of magnetic retentivity, one of said strips being rotatably mounted and having a normally stationary position, and the other of said strips being stationary and positioned so that one end thereof is adjacent to and overlaps one end of said rotatably mounted strip and the other end thereof is adjacent to and is overlapped by the other end of this rotatably mounted strip, said strips being so positioned relatively to said conducting body that the magnetic flux in the space surrounding the latter due to the current flow therethrough effects the magnetization of these strips with magnetic poles of N polarity at two of their adjacent ends and with magnetic poles of S polarity at their other two adjacent ends, an indicating element secured to said rotatably mounted strip, and means for making said indicating element invisible when said rotatably mounted strip is in its normally stationary position and visible when this rotatably mounted strip has moved away from its normally stationary position.

18. Apparatus for giving a permanent indication of an electric current surge that has occurred in a conductor after the surge has passed, comprising a magnetic element of high retentivity adapted to be positioned adjacent the conductor to be investigated so as to become permanently magnetized by the magnetic flux surrounding the latter during the surge, and an instrument calibrated with said magnetic element and responsive to the magnetic flux retained by the magnetic element as a result of said surge.

19. Apparatus for giving a permanent indication of the magnitude and direction of an electric current surge that has occurred in a conductor after the surge has passed, comprising a magnetic element of high retentivity adapted to be positioned adjacent the conductor to be investigated so as to become permanently magnetized by the magnetic flux surrounding the latter during the surge, and a polarized measuring instrument calibrated with said magnetic element and responsive to the magnetic flux retained by the magnetic element as a result of said surge.

20. The method of determining the magnitude of an electric current surge passing through a conductor, which comprises the steps of producing a permanent magnet by means of the magnetic flux surrounding the conductor during the surge, and then measuring the strength of such permanent magnet.

21. The method of determining the direction and magnitude of an electric current surge passing through a conductor, which comprises the steps of producing a permanent magnet by means of the magnetic flux surrounding the conductor during the surge, and then measuring the strength and determining the polarities of such permanent magnet.

22. The method of determining the magnitude of an electric current surge passing through a conductor, which comprises the steps of producing a permanent magnet by means of the magnetic flux surrounding the conductor during the surge, measuring the strength of the permanent magnet thus produced, and calibrating the results obtained with results similarly obtained with current surges of known value.

23. The method of determining the magnitude of an electric current surge passing through a conductor, which comprises the steps of placing a substantially unmagnetized magnetic element possessing a high degree of magnetic retentivity adjacent the conductor so as to become permanently magnetized by the magnetic flux surrounding the latter during the surge, and then placing the magnetic element in an indicating instrument which gives a deflection that is proportional to the strength of the residual magnetism of the magnetic element.

24. The method of determining the magnitude of an electric current surge passing through a conductor, which comprises the steps of placing a substantially unmagnetized magnetic element possessing a high degree of magnetic retentivity adjacent the conductor so as to become permanently magnetized by the magnetic flux surrounding the latter during the surge, testing the magnetic element after the surge by causing the magnetic flux retained by it to thread a coil so as to induce a voltage in the coil, and impressing this voltage on an electrical indicating instrument which is suitably calibrated so that each indication thereof corresponds to a known value of current passing through the conductor.

25. Apparatus for determining the time elements of an electric current surge passing through a conductor, comprising a plurality of magnetic elements adapted to be positioned adjacent such a conductor so as to become magnetized by the magnetic flux surrounding such conductor during a surge, at least one of said elements consisting of magnetic material possessing a high degree of magnetic retentivity and suitably proportioned so that the magnitude of the magnetic flux retained by it after a surge is substantially dependent only on the maximum value of the surge and is substantially independent of the time elements of the surge during the range of surges to be measured, and the other of said elements consisting of magnetic material possessing a high degree of magnetic retentivity and suitably proportioned so that the magnitude of the magnetic flux retained by it after a surge is dependent on the time elements and the maximum value of the surge.

26. The method of determining the time elements of an electric current surge passing through a conductor, which comprises the steps of placing adjacent the conductor a magnetic element consisting of high retentivity magnetic material suitably proportioned so that the magnitude of the magnetic flux retained by it after a surge is substantially dependent only on the maximum value of the surge and is substantially independent of the time elements of the surge within the range of surges to be measured, placing adjacent the conductor another magnetic element consisting of high retentivity magnetic material suitably proportioned so that the magnitude of the magnetic flux retained by it after a surge is dependent on the time elements and maximum value of the surge, measuring the strength of the magnetic flux retained by each magnetic element after the surge, and calibrating the results obtained with results similarly obtained with current surges of known time elements.

CLIFFORD M. FOUST.
HANS P. KUEHNI.